UNITED STATES PATENT OFFICE.

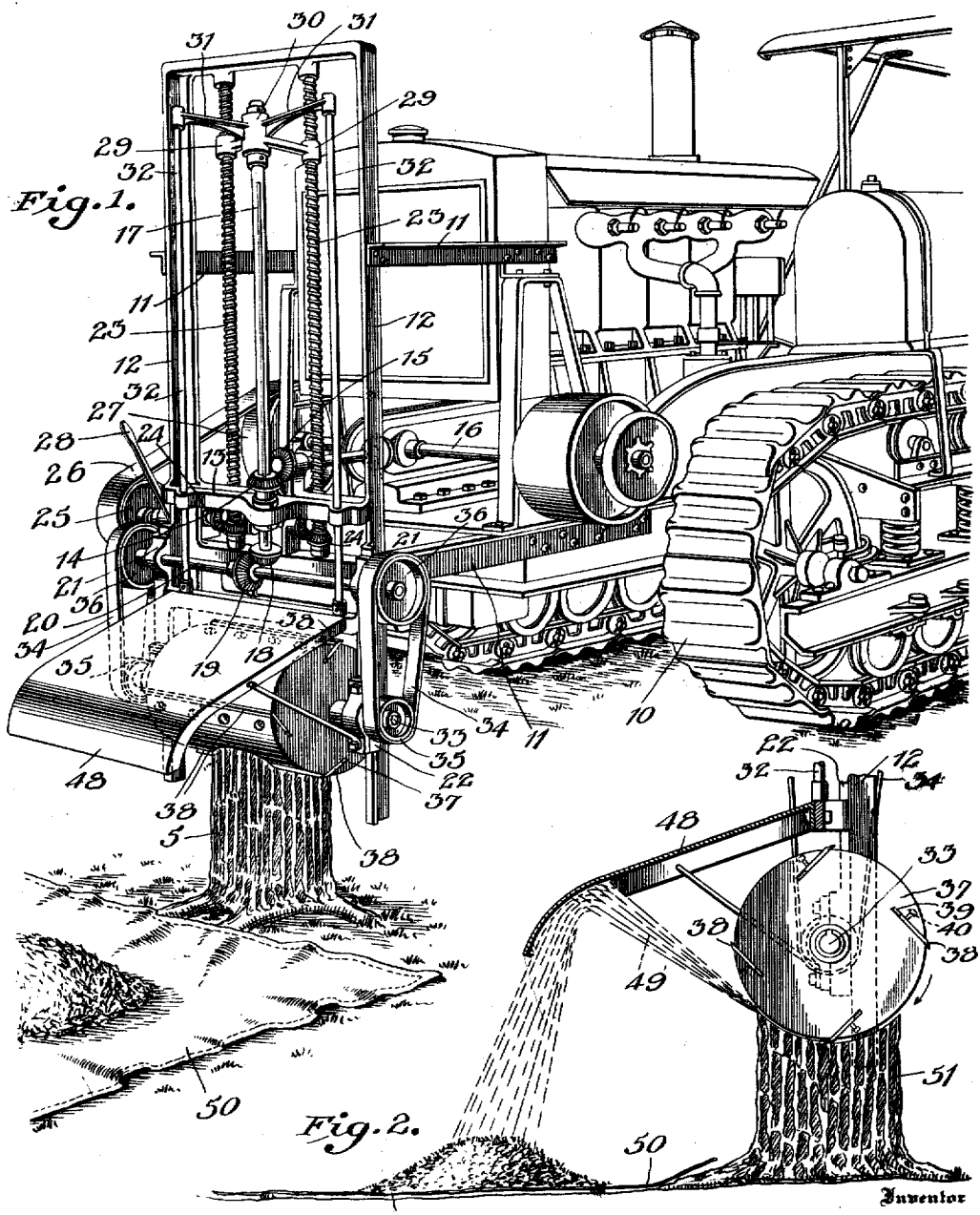

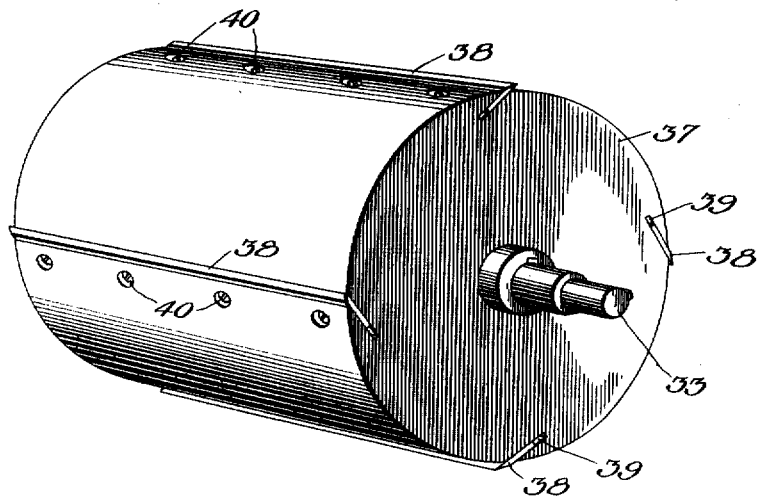
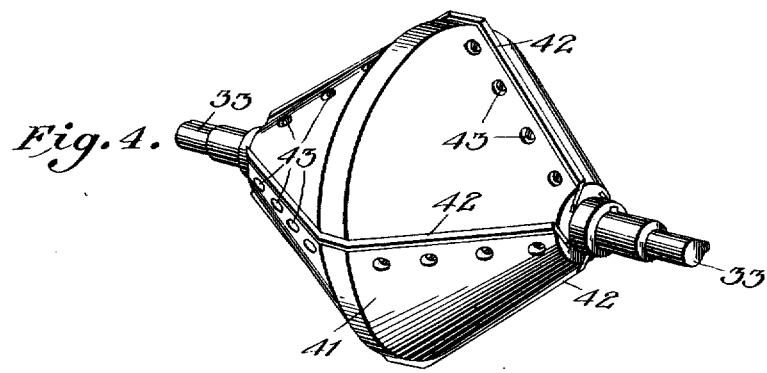
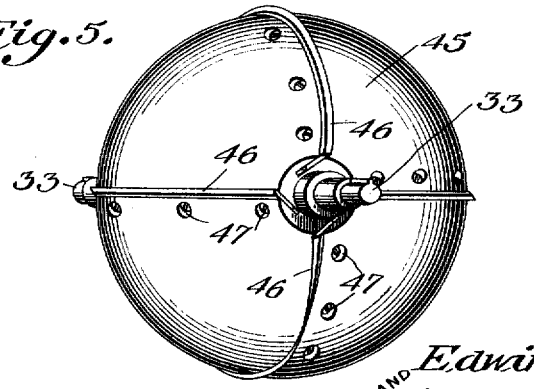

EDWIN A. McKOY AND GEORGE D. MOORE, OF NEW ORLEANS, LOUISIANA.

DISINTEGRATING AND CONSERVING MECHANISM.

1,312,450. Specification of Letters Patent. Patented Aug. 5, 1919.

Application filed November 17, 1917. Serial No. 202,539.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Disintegrating and Conserving Mechanism; and we do hereby declare the following to be a full, clear, and exact description of the invention, such as will enable others skilled in the art to which it appertains to make and use the same.

This invention relates to disintegrating and conserving mechanism especially adapted for disintegrating the material of standing stumps and conserving the valuable material thus disintegrated for further use.

A further object of the invention is to provide a cutter mounted upon a self-propelled dirigible vehicle adapted to move the cutter from place to place to operate upon standing stumps and carrying a power plant for actuating the cutter.

A further object of the invention is to provide a cutter-head of a type generically rotated upon a horizontal axis and specifically embodying different forms of peripheral surfaces.

A further object of the invention is to provide in such a stump disintegrating mechanism, a cutter rotating upon a horizontal axis carrying knives adapted when the cutter is rotated to throw the disintegrated material tangentially from the cutter with a baffle properly positioned to intercept the tangentially discharged material and guided to a predetermined receptacle.

With these and other objects in view the invention comprises certain novel constructions, combinations and arrangement of parts as will be hereinafter more fully described and claimed.

In the drawing,

Figure 1 is a perspective view of one type of cutter mounted upon a dirigible power plant of the usual and ordinary caterpillar type.

Fig. 2 is a diagrammatic end view of the cutter and baffle showing the manner of tangential discharge from the cutter to baffle and from the baffle to storage.

Figs. 3, 4 and 5 are, respectively, perspective views of modifications of the cutter.

Like characters of reference designate corresponding parts throughout the several views.

The general type of machine which forms the subject matter of this application is similar to the machine disclosed in co-pending application, Serial Number 192,566, filed September 21, 1917.

The dirigible power plant of the caterpillar type is shown conventionally at 10 to which a framework 11 has been secured carrying an upright frame 12. The frame 12 is provided with a cross bar 13 forming a bearing for a beveled pinion 14 intermeshing with a beveled gear 15 driven from the power shaft 16 of the power plant. A shaft 17 is splined within the beveled pinion 14 permitting such shaft vertical longitudinal sliding movement independently of such beveled pinion 14 but rotated thereby and therefrom. The shaft 17 carries upon its lower end a beveled gear 18 intermeshing with a pinion 19 carried upon a transverse shaft 20 which is journaled in bearings 21 carried upon an auxiliary frame 22 slidable upon the frame 12. The power from the power shaft 16 is therefore transmitted to the transverse shaft 20 irrespective of the vertical position of such shaft relative to the frame 12. The vertical movement of the auxiliary frame 22 is accomplished mechanically in any approved manner as by the feed worms 23 journaled in the frame 12 and driven by the gears 24 and pulley 25 by means of a belt 26 from the pulley 27 upon the power shaft 16. Any usual and ordinary type of reverse mechanism is employed for rotating the feed worms 23 in either direction to produce an upward or downward movement of the auxiliary frame 22, such reversing mechanism being indicated diagrammatically at 28.

To transmit movement from the feed worms 23 to the auxiliary frame 22 nuts 29 are mounted upon such feed worms carrying a thrust bearing 30 journaling the upper end of the slidable shaft 17 and also carrying arms 31 which are attached to rods 32 which in turn are rigidly connected at their lower ends with the auxiliary frame 22, whereby when the nuts are moved upon the feed worms the movement is transmitted to the auxiliary frame to either raise or lower such frame as circumstances may require.

Journaled also upon the auxiliary frame 22 is a shaft 33 driven from the transverse shaft 20 by one or more belts 34 passing over pulleys 35 upon the shaft 33 and other pulleys 36 upon the transverse shaft 20.

The shaft 33 carries a cutter which specifically may be of varying peripheral profiles. As shown at Figs. 1, 2 and 3, the cutter is in the form of a cylindrical drum 37 having knives 38 set into slots 39 positioned as cords of minor arcs of the peripheral circle. The knives are mounted in operative position with their cutting edges extended slightly beyond the periphery of the cylinder in any approved manner as by the bolts 40.

Instead of making the cutter as a cylinder it may be made, as shown at Fig. 4, in the form of two truncated cones set base to base with their axes coinciding, such form being shown at 41. Knives 42 are similarly employed, the cutting edges corresponding to the profile of the cutter and as in the type shown at Fig. 3 extending slightly beyond the peripheral surface of the cutter body. These knives are also maintained in operative position in any approved manner as by the employment of bolts 43.

Another modification of the cutter is shown at 45 in Fig. 5, being substantially spherical or spheroidal, having the knives 46 formed substantially as half an annulus and secured within the slots in the cutter by means of bolts 37.

Whatever the profile of the cutter it is journaled upon the horizontal shaft 33 and driven through the transmission mechanism previously described from the dirigible power plant. Carried also upon the auxiliary frame 22 is a baffle plate 48 properly positioned so that the cuttings from the cutter are thrown tangentially, as indicated at 49, against the under surface of the inclined baffle and are thereby deflected to any properly positioned receptacle as the sheet 50 placed upon the ground adjacent the stump.

In operation, the cutter will be moved from stump to stump and when properly positioned the cutter will be lowered to operative position by actuating the feed worms 23, and when in proper position will be driven by the power plant in the direction indicated by the arrow in Fig. 2, cutting the material of the stump, indicated at 51, in the manner of cutting by a planer head. The cutting will be continued by the auxiliary frame and the cutter being fed downwardly through the driving of the feed worms 23 until the entire material of the stump above the ground has been disintegrated and deposited, as described, and if the cutter heads, as shown at Figs. 4 and 5, are employed the cutting may be continued even below the surface of the ground.

We claim:

1. A machine for removing stumps and conserving the substance thereof, comprising a portable frame having means for supporting rotating and downwardly feeding toward the stump a horizontal shaft, a cutter whose diametrical and longitudinal dimensions are substantially equal to, or greater than, the transverse section of the stump, and a hood movable with said cutter and arranged to deflect and gather the cuttings.

2. A machine for removing stumps and conserving the substance thereof, comprising a portable frame having means for supporting rotating and downwardly feeding toward the stump a horizontal shaft, a cutter whose axial extent and some of whose diametrical planes are substantially equal to, or greater than the transverse section of the stump, and a hood movable with said cutter and arranged to deflect and gather the cuttings.

3. A machine for removing stumps and conserving the substance thereof, comprising a portable frame having means for supporting rotating and downwardly feeding toward the stump a horizontal shaft, a cutter whose greatest diameter and longitudinal dimensions are substantially equal to, or greater than, the transverse section of the stump, and a hood movable with the cutter and arranged to deflect and gather the cuttings.

4. A machine for removing stumps and conserving the substance thereof, comprising a portable frame having means for supporting rotating and downwardly feeding toward the stump a horizontal shaft, a cutter whose diametrical and longitudinal dimensions approximate the transverse section of the stump, and a hood movable with said cutter and arranged to deflect and gather the cuttings.

5. A machine for removing stumps and conserving the substance thereof, comprising a portable frame having means for supporting rotating and downwardly feeding toward the stump a horizontal shaft, a cutter whose greatest diameter and longitudinal dimensions approximate the transverse section of the stump and a hood movable with said cutter and arranged to deflect and gather the cuttings.

In testimony whereof we affix our signatures.

EDWIN A. McKOY.
GEORGE D. MOORE.